United States Patent [19]

Lewis et al.

[11] Patent Number: 4,643,592
[45] Date of Patent: Feb. 17, 1987

[54] VIBRATION LIMITING OF ROTATING MACHINERY THROUGH ACTIVE CONTROL MEANS

[76] Inventors: David W. Lewis, Rt. 12 Box 63; James W. Moore, 3409 Indian Springs Rd., both of Charlottesville, Va. 22901; Julien LeBleu, Jr., 4515 W. Meadow Ln., Lake Charles, La. 70605

[21] Appl. No.: 669,805

[22] Filed: Nov. 9, 1984

[51] Int. Cl.[4] .................. F16C 27/02; F16C 32/06; F16C 23/04; F16C 17/03
[52] U.S. Cl. .................. 384/100; 384/99; 384/114; 384/117; 384/247; 384/311; 384/448
[58] Field of Search ............ 384/91, 99, 100, 103–129, 384/247, 261–274, 302, 309–313, 317, 448, 428; 308/1 A, 1 R, 10

[56] References Cited

U.S. PATENT DOCUMENTS

| | | | |
|---|---|---|---|
| 2,733,857 | 2/1956 | Beams | 494/9 |
| 2,947,471 | 8/1960 | Beams et al. | 494/22 |
| 2,948,572 | 8/1960 | Beams et al. | 494/15 X |
| 2,961,277 | 11/1960 | Sternlicht | 384/99 |
| 3,124,395 | 3/1964 | Sternlicht | 384/110 |
| 3,537,943 | 11/1970 | Moser et al. | 308/1 R X |
| 3,560,064 | 2/1971 | Silver | 384/114 |
| 3,617,102 | 11/1971 | Wada et al. | 384/114 X |
| 4,119,375 | 10/1978 | Kirk et al. | 384/104 |
| 4,193,644 | 3/1980 | Miyashita | 384/107 |
| 4,512,671 | 4/1985 | Giers et al. | 384/428 X |
| 4,514,123 | 4/1985 | Johnstone et al. | 384/448 X |

FOREIGN PATENT DOCUMENTS

| | | | |
|---|---|---|---|
| 82884 | 7/1983 | European Pat. Off. | 384/448 |
| 123741 | 10/1978 | Japan | 384/99 |
| 192620 | 11/1982 | Japan | 384/103 |
| 8823 | 1/1983 | Japan | 384/448 |

OTHER PUBLICATIONS

William T. Thomson, Vibration Theory and Applications, 3rd Ed., Englewood, Cliffs, N.J., Prentice Hall, Inc., 1965, pp. 86, 183, 194.
Helmut Haberman & Maurice Brunet, "The Active Magnetic Bearing Enables Optimum Damping of Flexible Rotor", Societe DeMecanique Magnetique, B.P., 431, Vernon, France, ROMAC Short Course, Un. of Virginia 1984.
R. Holms & M. Dogan, "Investigation of Squeeze Film Dampers in Flexible Support Structures", NASA Conf. Pub. 2250, May 10–12, 1982, pp. 415–433.
Jorgen Tonnesen, "Experimental Squeeze Bearing Orbit Studies", Proceedings of the Conference on the Stability and Dynamic Response of Rotors with Squeeze Film Bearings, U.S. Army Research Office, Research Triangle Park, NC, May 8–10, 1979, pp. 83–95.

Primary Examiner—Stuart S. Levy
Assistant Examiner—Thomas R. Hannon

[57] ABSTRACT

Unwanted vibrations in rotating machinery are controlled from an "active" point of view, meaning, that certain parameters, and thereby vibrations, can be controlled while the machine is operating. This is accomplished from the theoretical knowledge known about rotor dynamics, mechanical vibrations, automatic controls, fluid dynamics, and bearing design theory to produce an active remedy to fundamental vibration problems. From the known information about the critical speeds of a machine and while the speed transients are occuring, active controls cause these critical speeds to be made variable and always away from the actual running speed. By this means, the machine does not have to "run through" the critical speeds but rather, the critical speeds are jumped over by control of certain parameters. This approach is novel but may be accomplished by several different techniques, of which a variety are presented herein.

It is recognized that this invention is not obvious are therefore may be, at first glance, thought to circumvent certain laws of physics. This is not the case, rather, it makes use of the subtleties of the laws of physics that generally go unnoticed.

2 Claims, 10 Drawing Figures

VIBRATION LIMITING OF ROTATING MACHINERY THROUGH ACTIVE CONTROL MEANS

BACKGROUND

Rotating machines include motors, generators, turbines, pumps, engines, and the like or a combination of these. Inherent with any machine that has rotating elements is the dynamic property that at specific speeds the machine tends to vibrate badly. This property has nothing to do with the "balance" of the rotating elements but rather stems from the combination of masses, that make up the machine, and the coupling of these masses, by other elements, which in themselves are described by the term "stiffnesses".

The undesirable machine vibrations are related to specific speeds, which are called "critical speeds". Many different means to reduce the vibration amplitudes at the critical speeds are described in the literature. These include different spring and damping devices whereby the energy associated with these critical speeds is redirected into some other motion or converted into another form of energy, specifically, heat.

The so-called dynamic vibration absorber takes the vibratory motions of the main components of the rotating machine and converts them into the motion of some other, less critical, component. The motion of this absorber is designed to function at a particular critical speed and thereby control the vibratory nature of the machine at one speed.

Many machines employ both a dynamic vibration absorber and some type of energy damper (which converts motion into heat). All of these devices are "passive" as a mode of operation. This means that once the device is designed and installed on the machine, no significant changes can be attained, so far as the capability to change the amount of energy absorbed is concerned. This limitation is severe for machines which may have changes in the dynamic properties over a period of time. So machines that suffer changes from erosion of the moving components (rotating or translating), or conversely the build-up of mass, generally run worse the longer they are in operation.

The alternative to passive devices, for the control of vibrations, is an "active" device. This implies a device that somehow senses the vibration level or other parameters and changes, is "active", in its response to the vibration. This is to imply some association, actively, with the speed of the machine and/or vibratory levels of some specific parts of the moving elements.

Active vibration level control systems are rather limited in number. One approach is through magnetic support systems which have been applied primarily to so called "rigid body" devices. Rigid body means that the main moving element behaves primarily as a stiff body with very little relative motion of one point on the body with respect to every other point on the body.

Long turbines, motors, pumps, et cetera, that do not behave as rigid bodies are generally more difficult to design so as to avoid having the undesirable dynamic motions when they are running. These "flexible rotor" machines are of special importance to the concepts embodied in this invention. By proper control, the vibrations inherent with the many critical speeds of flexible rotor machines can be reduced by this invention.

SUMMARY OF THE INVENTION

The rotating elements of a machine are supported and prevented from damaging the stationary components of the machine by the use of bearings. These bearings may be of many different designs including the fluid film bearings. Fluid film bearings come in many different fundamental designs, one of which is depicted in FIG. 1 and is known as a tilting pad bearing. The most simple embodiment of this invention consists of using the position of one pad of the tilting pad bearing to control the critical speed of the machine. Moving this single pad changes the stiffness of the bearing and this means changing the speed at which the unwanted vibration takes place.

In operation, this embodiment consists of a simple valve control that is operated by a person who watches the machine as it comes up in speed. As the running speed approaches the first critical speed of the machine, the person opens the control valve allowing oil to flow into the cylinder that causes the pad to move radially toward the center of the bearing. This motion reduces the effective clearance of the bearing thereby increasing the stiffness of the bearing and this in turn produces a new first critical speed that moves up in value. As the actual speed of the machine moves past the original first critical speed, the person operates the control valve once again which drains the oil from the cylinder allowing the pad to move quickly back to its original position. This then drops the critical speed back to its original design value which is now below the running speed of the machine. This quick passage through the running speed circumvents having the machine run at a critical speed and thereby avoids the build-up of amplitude of vibration that normally occurs as a machine is brought up to speed.

Note that this same procedure is followed when a machine is taken down through a speed range. That is, when a machine is going to be stopped or otherwise brought down in speed through a critical speed, the person who operates the control watches the machine speed and just before approaching the critical speed, opens the valve allowing oil into the cylinder so as to raise the pad which causes the upward shift of the former (original) critical speed so that it passes quickly through the running speed thereby avoiding running at a critical speed.

It is obvious to anyone practicing the art that, in the above description, the person doing the manipulating of the control valve may be replaced by an automatic device. Just as the person would look at a meter to decide when to turn the control valve on and off, the automatic device can turn the control valve on and/or off at specific speeds. This programmed device then takes the place of the man in the system so that it becomes an automatic control device that does not require the intervention of a person.

More sophisticated variations of the above description are given below. Also, variations on the means for changing the stiffness of the bearings(s) are noted. This implies that the embodiment of the invention just described is but one of many, that may be used, that will become obvious to anyone schooled in the art of engineering. This invention is not limited to the several specific embodiments described in this disclosure but implies the concept described herein.

BRIEF DESCRIPTION OF DRAWINGS

The present invention may be better understood by referring to the attached drawings which show a preferred embodiment as well as alternate forms of this invention.

The combination of a particular set of bearings with a specified rotor and a specific machine design, implies the dynamics of the rotor and support combination. Each combination of rotor design, supports, bearings, et cetera identifies a unique machine. This suggests that the proper dynamics for one machine, so as to minimize its vibration response as it runs through it operating speed range, will be different from other machines that may be similar in outward respects but none-the-less are unique in a dynamics sort of way, specifically, as described by the laws of physics.

This uniqueness makes the challenge of designing a machine difficult. For some machines it is almost impossible to predict the actual dynamic response that is to be expected. This makes the concepts of this patent even more important, as the more difficult the dynamical aspects of the machine become, the more difficult it is to design around the expected rotor dynamic problems.

MANIPULATING THE PROPORTIONALITY CONSTANTS

Figure 3:
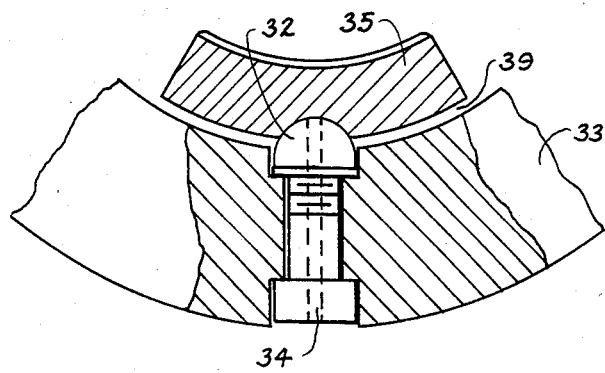
FIG. 3 is an alternate embodiment for moving the pad of a tilting pad bearing that employs the force of fluid to cause the pad to move radially inward through use of the oil property, known as viscosity, in conjunction with fluid pressure.

Realizing that the machine dynamics are significantly influenced by the values of the proportionality constants, $K_{xx}$, $K_{xy}$, $K_{yy}$, $K_{yx}$, $C_{xx}$, $C_{xy}$, $C_{yy}$, and $C_{yx}$, the first concept is to note how they may be changed. The K's and C's are the spring constants and the damping constants, respectively. Several possibilities exist. One may change the local viscosity of the fluid used in the bearing by injecting a slug of fluid that is of a different temperature. Almost all of the common fluids are very significantly influenced by their temperature and may be said to be dependent upon temperature for the specifying of their viscosity. A second means of altering the proportionality constants of the bearing comes about by realizing that the abundance of fluid or the starving of a bearing by having a dearth of fluid changes the film thickness of the fluid for certain types of bearings. The fluid film thickness severely influences the values of these proportionality constants. One means of manipulating the film thickness in a radial tilting pad bearing is illustrated in FIG. 3. In this drawing, the center of the main pivot is given a passageway allowing the control of fluid pressure which in turn controls the fluid rate of flow which in turn controls the resulting thickness of the fluid under that particular pad. Controlling the proportionality constants implies having control of the proportionality constants in a specified direction. Should more than one tilt pad be provided with such a passageway, control of the proportionalty constants will be available for more than one direction of control.

BRIEF DESCRIPTION OF THEORY

The rotor, by which is meant all of the attached rotating components of a machine, is supported by devices called "bearings". Bearings are those elements that purposely interface the stationary components, including the machine frame, with the moving components, which when considered together may be called the rotor, in such a manner so as to prevent any destructive interaction or damaging coaction of the various elements.

One form of bearing is classified as a "fluid film" bearing, the name coming from the fact that the "clearance" between the moving and stationary portions of the bearing is filled with fluid. Typical fluids used in fluid film bearings include oil, water, and air. In some special machines, liquid oxygen, liquid hydrogen, and some "two-phase" fluids are used as the fluid in the fluid film bearing. The space, previously identified as the clearance, between the moving and stationary components of a fluid film bearing influences the "stiffness" of the bearing. Stiffness means the force required per unit of deflection between the moving and stationary components at the bearing. Bearing stiffness, of fluid film bearings, is dependent upon the fluid viscosity as well as the clearance of the bearing.

The stiffness of a bearing is not quite the same as that associated with a simple spring-mass system, described in the subject of physics known as "mechanics", where the restoring force opposes the displacement. In a fluid film bearing, oriented with the axis of the rotating shaft horizontal, pushing the rotating shaft in the vertical direction produces a motion that is both vertical and horizontal. Similarly, pushing the rotating horizontal shaft in the horizontal direction, perpendicular to the axis of symmetry of the rotor, will cause the shaft to move in both the horizontal and vertical directions.

So a displacement in the x-direction, the horizontal direction, is opposed by a force in that direction implying a spring constant Kxx. Similarly, a displacement in the y-direction, the vertical direction, will be opposed by a force in that direction indicating a spring constant Kyy. The cross coupling effect means that when summing forces in the x-direction, one force term arises from any displacement that occurs in the y-direction and is proportional to it. This implies a proportionality constant that is identified by the term Kxy. A similar term arises, Kyx, when considering the forces in the y-direction.

A yet additional set of terms appears when summing forces in fluid film bearings and they are the "damping" terms. Thus, any velocity in the x-direction will yield a force term proportional to the velocity, the proportionality constant being Cxx. Similarly, any velocity in the y-direction produces a force term proportional to the velocity with the proportionality constant being Cyy. But as before with displacements, so it is with velocities and the respective velocity cross coupling proportionality constants are Cxy and Cyx.

These various proportionality constants have been ascertained by various writers and tabulations made for them. They are rather complex in nature and very much dependent upon the actual form of the fluid film bearing. Thus the industry has a variety to choose from including tilt pad, pressure dam, multilobe, offset, and a plethora of "crushed" bearing shapes.

DETAILED DECRIPTION OF INVENTION

Figure 1:
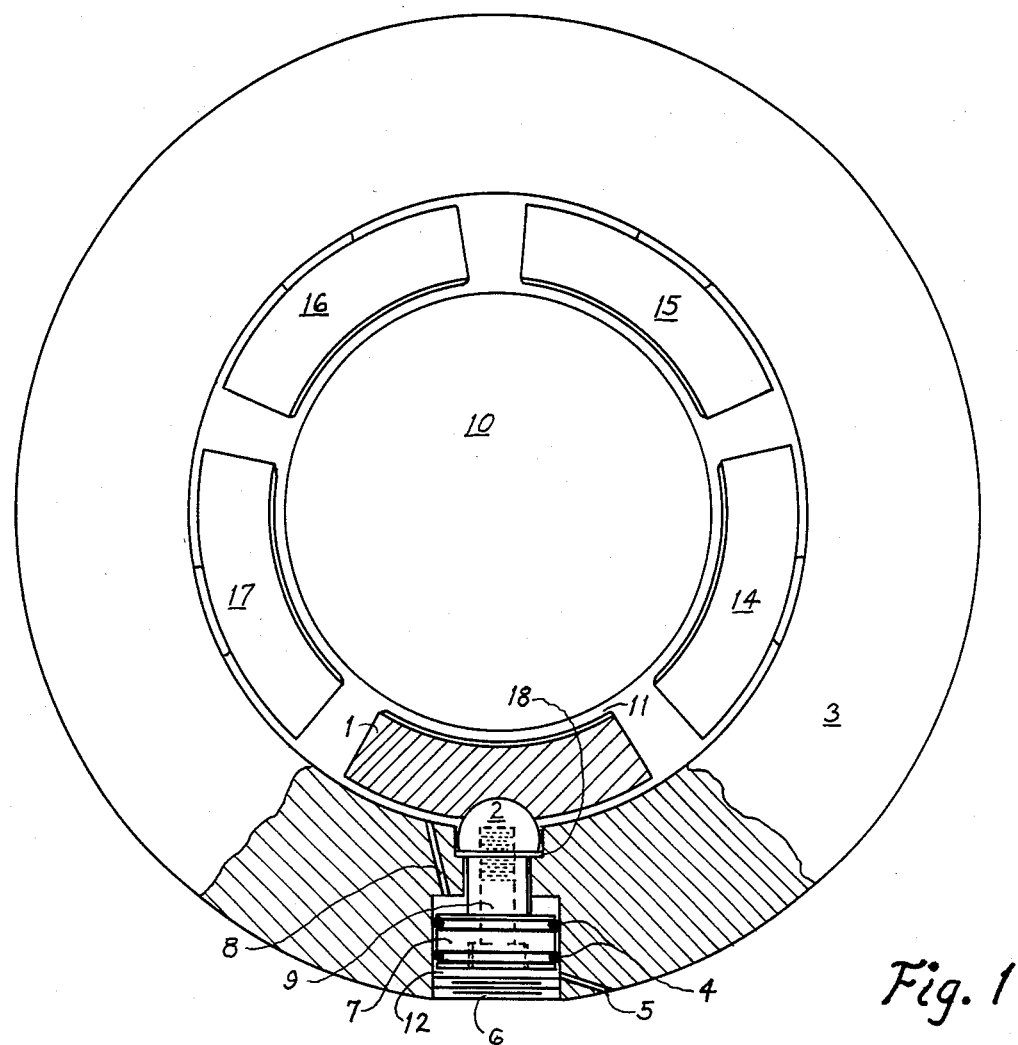
FIG. 1 is a five pad tilting pad fluid film bearing with one pad having a means for being moved radially. This radial motion causes changes in the proportionality constants, the stiffnesses and the damping capabilities, of the bearing which in turn changes the critical speeds of the rotor system.

The significance of the clearance between the rotating and stationary portions of the machine has been noted previously. FIG. 1 illustrates a cross-section of the machine at one of the bearings in which the rotating portion 10, frequently called the journal is separated from the nearest portion of the stationary element, the pad 1 of the tilting pad bearing by a space 11 identified as the clearance which is filled with a lubricant, typically being a special oil. The pad 1 may have motion relative to the adjacent surrounding fixed elements by means of a hemispherical unit 2 which allows the pad 1 to tilt, hence the term generally classifying the bearing as a "tilting pad" bearing. The clearance 11 may be controlled by moving the hemispherical head 2 which is attached to the support 9 which moves relative to the bearing housing 3 through the action of the plunger 7 having the O-ring seals 4 so that when oil, under pressure, is admitted into the cylinder 12 through the inlet 5, the plunger 7 will be raised causing the clearance 11 to be made smaller. This reduction in the clearance 11 causes an increase in the stiffness of the bearing, as explained previously, which in turn produces a change in the critical speed of the rotor sytem. FIG. 1 depicts a five pad bearing, the individual pads being identified by the numbers 1, 14, 15, 16, and 17. This preferred embodiment of this invention is not dependent upon the number of pads of the bearing but this FIG. 1 is simply illustrative of one such possible design configuration. For tilting pad bearings containing more than nine pads, two pads will in general be made active, meaning they are movable in a radial direction, the hemispherical head(s) 2 will have the necessary hardware so as to be controlled by hydraulics. Access to the movable hardware including the plunger 7 is through the port that has been covered by the plug 6 that is put in place after the other elements are assembled.

It should be noted that this type unit is a "fail safe" device in that the pad 1 may move radially (downward in FIG. 1) outward until it strikes the stop 18, of FIG. 1 which is fitted so that the movable controllable pad has the same clearance as the fixed pads 14, 15, 16, and 17. This is equivalent to saying that this movable pad bearing is no worse than a fixed pad bearing from a safety point of view and this condition occurs only if there is failure of the oil supply to the plunger 7, which is called a hydraulic piston in the more common hydraulic actuators, of the bearing.

Figure 2:
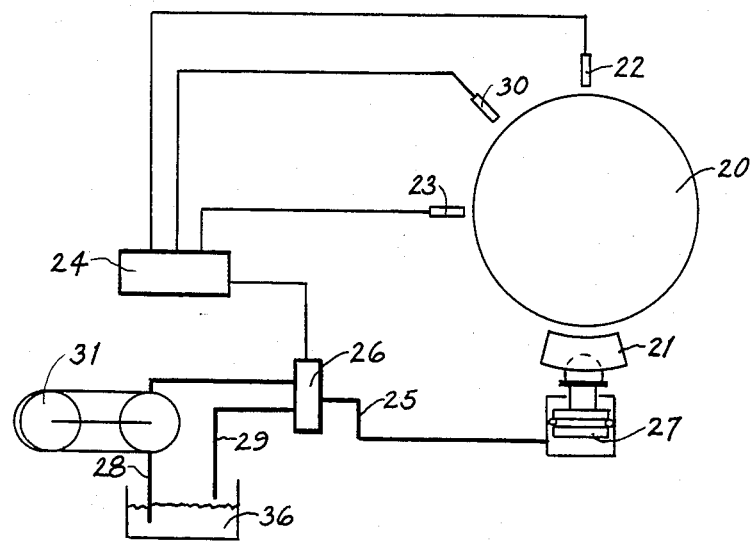
FIG. 2 is a system describing an automatic means for controlling the motion of one pad of a tilting pad bearing independent from human intervention.

FIG. 2 shows just the one controllable pad 21, previously referenced in FIG. 1, but with the necessary additional components of the control system. In FIG. 2, the position of the journal 20, otherwise known as the shaft, is determined through some type of electronic probes sensing the vertical location by the Y-probe 22 and the horizontal location by the X-probe 23, this information being supplied to the electronic controller 24. In passing, it should be noted that the shaft sensing probe devices are readily available in the industrial world and are such that they need not touch the shaft in order to identify the exact location of the shaft in space (one such manufacturer is the Bently Nevada Corporation of Minden, Nev.). Two distinctly different modes of operation are represented by FIG. 2, one being somewhat simpler and therefore somewhat less expensive to build than the other. In one mode of operation, the key phasor probe 30, of FIG. 2, feeds a once per turn pulse to the electronic control 24 which converts that series of pulses into the equivalent of the speed of rotation of the shaft and when the speed is increasing the electronic control 24 continuously compares this speed with the critical speeds previously stored in memory and as the running speed approaches each critical speed, the electronic control 24 opens the pilot valve 26 thereby forcing pressurized oil coming from the pump and motor 31 into the hydraulic chamber through the pipe 25 causing the plunger 27 to raise radially upward lifting the pad 21 and thereby decreasing the clearance between the pad 21 and the shaft 20 causing an increase in the bearing proportionality constants, including the spring rate stiffnesses, which in turn raises the critical speed to a higher value which is above the running speed. The continual sensing of the speed of the shaft 20, noted in FIG. 2, through the key phasor probe 30 and the electronic control 24 determines when the actual running speed exceeds the previously programmed critical speed by a fixed percentage, typically five percent, which causes the pilot valve 26 to vent the previously pressurized line 25 allowing the oil to drain through drain line 29 into the oil sump 36. This describes the operation of the electronic controls during the "run up", that is during increasing speed of the rotor, of the machine. This mode of operation is for each of the critical speeds of the rotor system.

This simplified mode of operation is just as easily understood for the "run down", that is during decreasing speed of the rotor, of the machine. Referring again to FIG. 2, the speed of the shaft is determined by the electronic control 24 through the signal coming from the key phasor probe 30 and as it approaches one of the critical speeds the pilot valve 26 is opened permitting the flow of pressurized oil from the pump and motor 31 through line 28 through the pilot valve 26 through the line 25 thereby raising the plunger 27 causing the pad 21 to be raised producing an increase in the bearing proportionality constants, including the spring rate stiffnesses, thereby increasing the new critical speed above the actual running speed. Once the actual running speed drops below the original critical speed by a fixed percentage, typically 3 to 5 percent, the electronic control 24, of FIG. 2, signals the pilot valve to open and dumps the pressurized oil from line 25 to the sump 36 through the drain line 29 which allows the pad 21 to drop downward to its original position. This simplified mode of operation is followed during the run down of the machine through each of the programmed critical speeds.

The electronic control 24 shown in FIG. 2 serves the functions just described which are rather simple in light of the common computers now available. This is to say that no one specific computer is required to handle the decisions and send the appropriate signals to the pilot valve 26 of FIG. 2 nor to process the incoming signal from the key phasor probe 30 noted in this same figure. The use of a computer will allow one to store any number of critical speeds in the memory. The number of such speeds normally will not exceed 7 to 10 for the common rotating machines now in use. Actually, for almost all of the computers on the market, hundreds of critical speeds could be stored without exceeding the capacities of even the smallest such computers. It goes almost without saying that the particular programming language used with the particular machine is not significant as all of the technical languages will permit the necessary comparisons, the reference look-ups, and the signal processing required for this simple mode of operation.

A more elaborate mode of operation of this vibration limiting device is now explained and as might be concluded, this will permit a more refined and closer control of the rotating machine. Referring to FIG. 2, two shaft position sensors are depicted, one being the x-direction probe 23, or called simply the x-probe, and the other is the y-direction probe 22, or called more simply the y-probe, both of which feed signals to the electronic control 24, which amongst other things includes a minicomputer in functional capabilities.

The functioning of the device is as follows. The key phasor probe 30, of FIG. 2, feeds a once per revolution signal to the electronic control 24 thereby indicating both the speed and the orientation of the shaft 20 relative to any and all bodies attached to the shaft 20, which composes the rotating unit, otherwise identified as the rotor. The minicomputer within the electronic control 24 of FIG. 2 samples the signal from the x-probe 23 and stores it for one revolution of the shaft 20, sorts the samples selecting the largest value, and with the position obtained from the key phasor probe 30, determines the phase value, which is the angle between the peak shaft displacement and the key phasor mark. This phase value provides the reference that is required to optimize the application of changes of the bearing proportionality constants.

Figure 4:
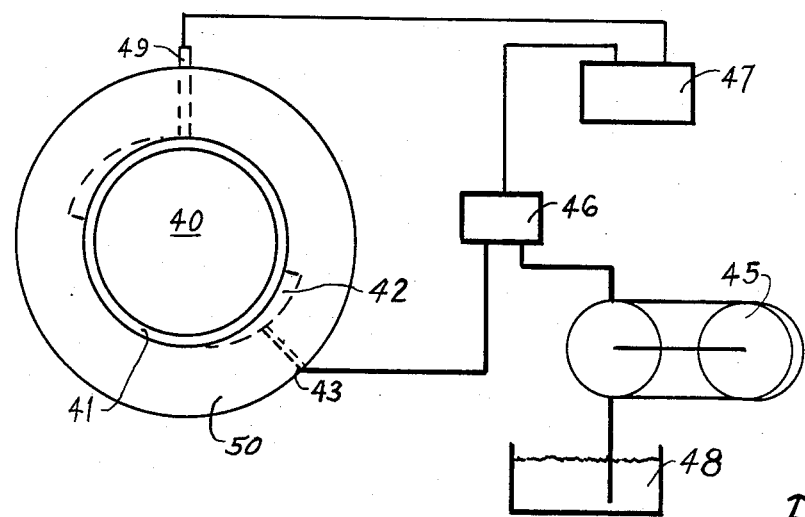
FIG. 4 is yet another embodiment of this invention being used with a pressure dam fluid film bearing in which the shift of the critical speed is accomplished by controlling both the viscosity and the amount of oil being supplied to one of the dam regions through which action the stiffnesses of the bearing are manipulated. Either the viscosity or the total oil flow rate supplied to one such pressure dam region may be used for controlling the stiffnesses, but the figure combines these two alternatives in one presentation.

Another embodiment of this invention is illustrated in FIG. 4 as being applied to a "pressure dam" fluid film bearing, in which the dam 42 on one side is fed through a passageway 43 with high pressure oil which passes through a combination heater/cooler 46 which can change the oil temperature, the oil supply coming from a sump 48 by means of a pump and motor unit 45.

In FIG. 4, the shaft 40 is marked so that the speed is sensed by the key phasor sensor 49, or any other means of indicating speed, the signal of which is fed to the electronic control 47 which is programmed so that as the speed approaches a critical the oil temperature is changed by means of the heater/cooler 46. FIG. 4 also indicates the clearance 41 that exists between the shaft 40 and the stationary part of the bearing 50, said clearance, in combination with the oil viscosity and shaft speed, duly influencing the bearing proportionality constants which in turn control the actual critical speeds of the machine.

The procedure during run up of the machine may be understood by referring to FIG. 4 while considering the following explanation. As the shaft 40 increases in speed, the electronic controller 47, compares this sensor 49 indicating speed with preprogrammed critical speeds and at 10% below a critical speed causes the oil to flow through the cooled portion of the heater/cooler which increases the viscosity of the oil which in turn raises the stiffness of the bearing proportionality constants moving the critical speed up and away from the actual running speed. As the running speed increases further, the oil is diverted through the heated portion of the heater/cooler 46, by the action of the electronic controller 47 acting on valves which are contained in the heater/cooler 46, which drops the oil viscosity which lowers the machine critical speed by dropping the bearing proportionality constants so that the critical speed of the machine is dropped below the running speed.

The explanation noted in the previous paragraph, is repeated, during run up, as each critical speed is approached.

Still referring to FIG. 4, the procedure programmed into the electronic controller 47 for the run down of the machine may be noted as follows. The sensor 49 detects the decrease in the speed of the shaft 40 and when this speed is within 10% of the preprogrammed critical speed the electronic controller 47 operates valving in the heater/cooler 46 shunting the oil through the heated portion which increases the oil temperature and simultaneously reduces the critical speed of the machine. As the running speed drops further so that it is below the preprogrammed critical speed by approximately 10%, the electronic controller shunts the oil through the cooled portion of the heater/cooler dropping the oil temperature and thereby raising the viscosity and concurrently raising the stiffnesses of the bearing proportionality constants bringing the critical speed of the machine above the running speed.

It should be noted that the heater/cooler 46 of FIG. 4 may be either a heater or cooler alone in which case the temperature differential required will be equal to the difference between the hottest temperature generated and the coldest temperature generated in the oil by the combination heater/cooler. The choice of the heater/cooler unit will be dependent upon the type plant and the cost of other items in the systems. The important concept to be noted here is the influence of temperature on the over all vibration operation of the machine, rather than the type of cooler or refrigeration system employed or the form of the heater, whether steam, electricity, or other energy source.

The importance of the temperature of the lubricating oil may need further emphasis. In FIG. 4, the injection of lubricating oil into the dam region 42 that is of a different temperature, hence different viscosity, than that being supplied to the other dam regions of the pressure dam bearing, will cause a change of the bearing parameters. Of course, as noted before, a change of the bearing parameters will produce a shift of the critical speeds of the machine. Note further, that the number of dam regions in a pressure dam bearing will be selected by the machine designer.

The influence of the bearing parameters due to oil viscosity was noted in the previous paragraph. Referring to FIG. 4 again, the purposeful starving of oil to one dam region, such as the lower dam 42, will also cause a change in the bearing parameters so the electronic controller 24 may be used to establish different critical speeds by controlling the flow rate of oil rather than or in addition to controlling the oil temperature.

For anyone knowledgeable in the art of rotor dynamics, fluid properties, feedback control, bearing design, and the concept of critical speed in the mechanics of vibrations, it is obvious how this invention may be applied to many different types of fluid film bearings for the vibration reduction of rotating machinery. Some additional subtleties will be noted for yielding better and more desirable vibration control for machines having changing dynamic properties.

Figure 5:
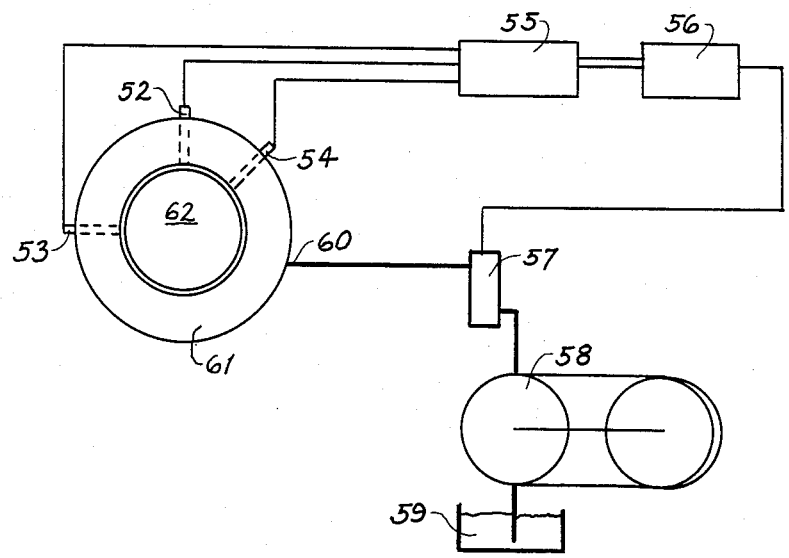
FIG. 5 is an additional embodiment of the invention in which the system includes an adaptive controller for the circumvention of running through critical speeds when the critical speeds change over the life of the operation of the machine.

Another embodiment of this invention is better understood by referring to FIG. 5 in which the fluid film bearing 61, be it a tilting-pad, pressure dam, multilobe or whatever, is subjected to a more elaborate control format. In FIG. 5, the x-probe 53 senses the horizontal position of the shaft 62, the y-probe 52 senses the vertical position of the shaft 62. Both probes feed their respective signals to the electronic processor 55, which in turn sends signals to the electronic controller 56, which opens and closes the proper valves 57, through which high pressure oil flows by means of the pump 58 from the sump 59 into the pressure dam, multilobe, crushed, or tilt pad by line 60, depending upon the type of bearing 61 that is being used. Continuing the reference to FIG. 5, the key phasor probe 54 feeds a signal into the electronic processor 55, thereby establishing the means for calculating the instantaneous speed of the shaft 62 as well as determining the phase relationship between the signals coming from the x-probe 53 and the y-probe 52. For those not well versed in this determination of the phase relationships, a further bit of explanation may be useful, hence a diversion for a paragraph to relate this detail.

Probes that sense the instantaneous position of a rotating shaft are used in conjucntion with another probe, typically called a key phasor, that senses a fixed spot on the shaft. In this way, the actual vibration level of any point being sensed by a probe can be referenced back to a known phased position relative to the key phasor, "fixed spot", on the rotating shaft. Thus, it is possible to look at an instantaneous measurement and determine that a known postion on the shaft, say 38 degrees clockwise from the "fixed spot", has a displacement from equilibrium (the vibration level) of 0.34 mils. If measurements are made every 2 degrees, say just as an example, then the electronic processor will store the actual position measurements (from static equilibrium) from a probe for a total of 180 entries for each revolution of the shaft. This same electronic processor can then search these 180 measurements and select the largest (the peak vibration) and associate with it the phase between it and the fixed spot. This process is repeated for every revolution so that any control changes can be made on the basis of the peak vibration and phase. By vector algebra, the measurements coming from two probes that are oriented 90 degrees in space, one with respect to the other, the largest amplitude of vibration of the shaft in the plane of the two probes can be determined and the phase, associated therewith, can also be calculated. Such instruments are available commercially that can do the above processing, in real time, meaning, while the machine is actually running.

OPTIMAL VIBRATION CONTROL

FIG. 5 presents the description that may be used for optimal control of vibrations, which includes the electronic processor 55 and electronic controller 56 and associated valves 57, all of which have been previously referred to. This particular figure will now be described in more detail so that the concepts may be more fully understood.

A preliminary study of a particular machine will allow the setting into the electronic processor the several critical speeds. Then as the machine is operated, a continuous comparison will be made between the running speed and the critical speeds previously stored in the electronic processor. But for every complete rotation of the rotor, the sensors will measure the vibration position of the shaft, say every two degrees, and the maximum amplitude of vibration and respective phase angle will be computed. This has been noted previously and also, the fact, that this will be done in "real time". It should be noted that some computers, which make up a portion of the electronic processor, run at a speed that will not allow the complete calculations to be made during the same instant that the complete revolution of the shaft takes place. Real machines do not respond immediately with infinite vibration amplitudes when run at critical speeds but rather require many revolutions of the rotor before the vibration levels exceed those that are considered acceptable. This means that even rather slow minicomputers can be employed, implying that rather inexpensive computers can be employed in this design. So, for example, one revolution of the shaft can take place with the concurrent measurements of the displacments. During the next revolution of the shaft the necessary calculations for determining the phase and amplitude of the vibration can take place. And during the next revolution of the shaft, the prescribed controls can be implemented.

It must be understood that measurements will be made for each revolution of the shaft and the calulations made for each set of measurements. Also, for each revolution of the shaft, the control process will be taking place. In short, sensing will be made continuously, say for every two degrees of rotation of the shaft. Computations will be made for every set of data taken, specifically, for each revolution of the shaft. And the controls will be functioning continuously but will be operating on the basis of data gleaned not on the most recent revolution of the shaft but on the second most recent revolution of the shaft. With this scheme of data processing, even the fastest rotation of the rotor will yield sufficient time to make the necessary computations without having concern about misalignment of the control function with respect to the proper phase of the rotor. Note that the data from every other rotation of the shaft will be stored in the same memory location of the computer. This shifting of the memory location for sensed data is a commonplace mode of operation for data processing and by this means the computation time can be obtained without giving up any other advantages.

Another important data processing function will be carried out simultaneously. The maximum vibration amplitude and corresponding phase will be stored as a function of the speed of rotation of the rotor. This set of data will be stored as a function of time to allow comparison of the running condition of the machine. By a comparison, say every hour, the present condition of the machine can be ascertained to determine if some part of the rotor is undergoing a change. This will signal the need to make a change in the response of the controls.

DISPLACEMENT CONTROL

One mode of operation is through proportional control in which the instantaneous displacement, from equilibrium, of the rotor is fed directly as a signal into the controller and this in turn operates a proportional valve to supply pressurized oil into the movable pad (or the appropriate activator element, such as the dam region of a pressure dam bearing). The amplitude of this activator signal is controlled by adjusting the gain to minimize the vibration level at each speed. As before, this gain level is stored as a function of speed so that convergence to the optimum gain is done quickly by starting from a value (that has been stored) that is close to the optimum value. This is to make clear that the control is changing continuously as the rotor is running and the previously described calculation, for obtaining the maximum amplitude and phase, is used to assure that the control is minimizing the maximum amplitude of vibration. One has to be aware of the speed of the rotor to know what critical speed it is running near. The reason for this is so that the dominant mode shape is known. With this information, the proper phasing can be calculated for the application of the motion to the pad, which is under control.

Any one cognizant of the dynamics of rotors recognizes the importance of modal analysis and this information must be part of the data stored in the computer. The better the model of the machine the more optimum will be the prescribed control search and refine process. However, by storing the response of the rotor as a function of speed and simultaneously as a function of the gain used in the control circuit (which operates the valving), even a poor initial model of the machine will be improved upon during the operation of the electronic control.

VELOCITY CONTROL WITH DISPLACEMENT CONTROL

The same control procedure, just described, can be used to implement a sensing signal that is the instantaneous radial velocity rather than the instantaneous displacement. The result is a control that simulates the use of a damper rather than the equivalent of a force. Moving the pad continuously during each degree of rotation of the shaft is in essence injecting a force onto the rotor. If this force is proprotional to the instantaneous velocity the effect is as though a damper, active at that, is operating on the rotor.

The most flexible control algorithm is to use both the radial displacement and the instantaneous radial velocity to yield a control signal. With this combination, the optimum damping and forcing signal can be generated to limit the vibration of the rotor.

OPTIMUM DISPLACEMENT AND VELOCITY CONTROL

Figure 7:
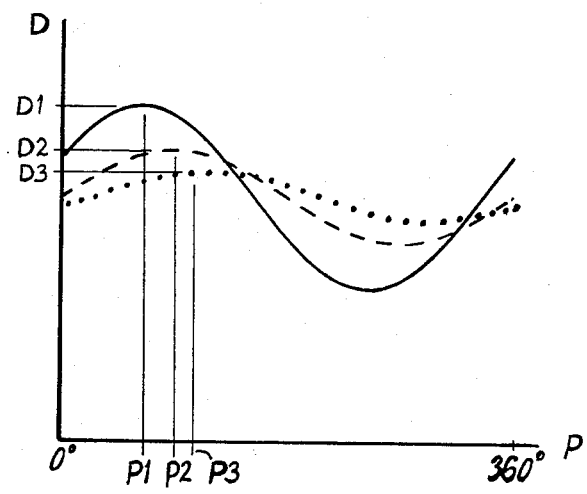
FIG. 7 depicts vibratory level changes that take place due to manipulations of the displacement and velocity amplifier gains of an electronic controller.

The means for establishing optimum control when both the instantaneous radial displacement and the instantaneous radial velocity are employed can be more easily understood by referring to FIG. 7. FIG. 7 depicts, by the solid line, the displacement versus phase angle, referenced with respect to the key phasor position, at a given running speed and for a particular displacement gain and a particular velocity gain, these two gains being, in general, different from one another. The displacement D of FIG. 7 is always positive indicating that there is some average clearance between the moving shaft and the stationary part of the system.

While the machine is running, the electronic controller changes the displacement gain by one percent and for one complete revolution of the shaft senses the displacement and recalculates the maximum displacement and corresponding phase. It compares the new value with the previous value and if the new peak displacement is less than the previous value, it saves the new values and once again changes the gain. This process is continued until the new value of maximum radial displacement is greater than the previous value in which case the process, which has been iterated with, is changed. Now the phase of the displacement gain is changed again searching for the peak displacement and comparing it with the previous value, saving the new value so long as there is an improvement (a decrease) in the vibration level. At this point, the optimum displacement versus phase graph may appear as the shaded curve in FIG. 7 indicating a decrease in the peak displacement, from D1 to D2, and a shift in the location of the respective peaks, a phase shift, from P1 to P2.

The previously described process is now repeated, except that the electronic controller changes the velocity gain instead of the displacement gain. Again, the search continues changing the velocity gain followed by change in the velocity gain phase and then back to the velocity gain and then again back to the velocity gain phase until this process produces no further improvement in the final vibration level. The resulting new graph is shown as the dotted lne of FIG. 7 in which the peak displacement has been further reduced from D2 to D3 and the phase corresponding to the peak has shifted from P2 to P3.

The time required for the above changes is rather short as the modifications are made for each complete revolution of the shaft. As the changes are small, the dynamics are essentially quasi steady state so that no settling time is required. So for a hundred changes to be made, only one hundred revolutions of the shaft are required.

This optimum search procedure can be carried out continuously so that any changes in the machine can be compensated for as the changes occur. Thus, errosion or other types of wear or other changes in the unbalance of the machine can be handled by this active feedback control system so that the vibration level can be held to the optimal minimum.

The displacement and velocity gain settings can be monitored so that the condition of the machine can be ascertained even while it is running in an apparently good condition. That is to say, that the greater the values of the gain settings, the poorer is the condition of the machine even though this automatic controller is maintaining a good minimum vibration standard for operation. In short, the condition of the machine can be reflected even though the apparent operation of the machine is satisfactory.

It should be apparent to all versed in the art, that the above described control algorithm is applicable to tilt pad bearings, pressure dam bearings, and the many other types of fluid film bearings previously enumerated, in which control of one of the parameters influencing the bearing proportionality functions (stiffnesses or damping or both) is available.

For high speed machines, it is particularly important that consideration be given to the location of the valving with respect to the bearing under control. Long lines from the valves to the bearing will result in delays in the changes of the bearing proportionality constants and hence poorer and poorer control. For very high speed machines, the controlled valves will, in general, have to be situated adjacent to the bearings. The electronic devices can be located more conveniently or where space is not a premium although long lines transmitting electronic signals are not generally desirable in high electric fields.

The control algorithm just described has its foundation in mathematics and is a variation of the "method of steepest descent". Simultaneous application of the method to both the radial displacement and the radial velocity can be made through use of the minicomputer that is part of the controller. Other algorithms may be employed, such as the "least squares method", or the use of "random number generators" with limited ranges specified for the gains of the displacement and velocity amplifiers of the controller. The particular algorithm used is not the major point to be made. The use of the control algorithm as being applied to one particular parameter of a fluid film bearing in such a manner than the vibration amplitude is limited is important. The relationship between the vibration level and the controlled oil film temperature is important. Or alternatively, the relationship between the vibration level and the controlled tilting pad position is important. Or further, the relationship between the vibration level and the controlled hydrostatic pressure applied to the fluid film bearing or the controlled fluid pressure applied to the sectored support ring is important. One important fact is also hereby noted. In many types of rotating machines, the vibration levels are measured typically as being part of one-thousandths of an inch. So correspondingly, the types of motions that are being superimposed on the bearings, and the order of magnitude of the changes that are necessary in the bearing positions, amount to but a few ten-thousandths of an inch. This is to declare that the hydraulics that one thicks about, say in earth moving equipment and commercial cranes and the like, are not in the same realm as the hydraulics and electrohydraulic controls that are the concern of this patent.

Figure 6:
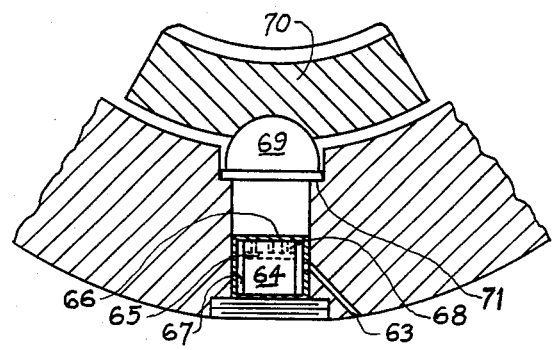
FIG. 6 is another alternate embodiment of the invention that avoids the need for having sliding seals like those depicted in FIG. 1.
Figure 8:
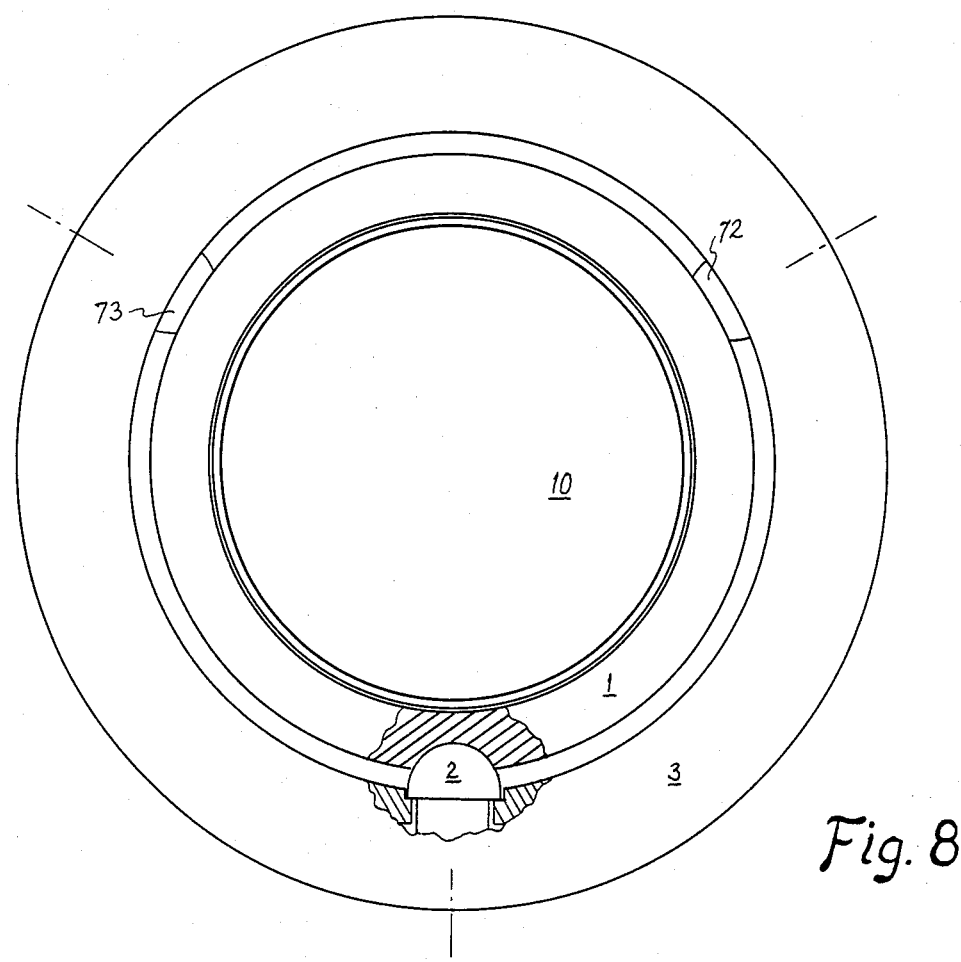
FIG. 8 is an alternate embodiment of the concepts of this invention by which a bearing support ring is moved by actuators so as to apply forces to the rotating shaft.

Another embodiment of this invention, illustrating a different means for moving a pad of a tilt pad fluid film bearing, is shown as FIG. 6 in which the pad 70 is held by the support 69 which rests against a membrane 66 which rests on an almost rigid block 64 into which some passageways 65 have been machined. In operation, oil is fed by means of the connecting passageway 63, of FIG. 6, into the cylindrical volume 67 passing into the passageways 65 pushing upward against the membrane 66 which in turn lifts the support 69 thereby raising the pad 70. With this embodiment, no sliding seals are required as the membrane 66, in FIG. 6, encapsulates the high pressure oil, supplied through the connecting passageway 63, yet does not have to carry the radial load from the pad 70 when it is not pressurized as the almost rigid block 64 and/or the shoulder 71 carries the load. FIG. 6 is an alternate embodiment to that shown in FIG. 3 which is in itself and alternate embodiment to that illustrated in FIG. 1 which is to say that many such configurations can be presented once the fundamental concept of this invention is understood by someone practiced in the art of engineering design. The design employing passageways 65 of FIG. 6 may just as readily be replaced by a porous media 68, such as a sintered metal or ceramic structure. Another embodiment of this machine illustrating a variation in which the tilting pads of FIG. 1 are replaced by a single journal ring is shown in FIG. 8. In this embodiment the journal ring 1 is supporting the journal 10. Ring 1 is externally supported with reference to the machine frame 3 by a controlled support 2 of the same nature as item 21 in FIG. 2, and by two or more similar devices as represented by 72 and 73.

This embodiment represents yet another means of achieving the objectives of this invention since the supports 2, 72, and 73 are controlled in the same manner as in FIG. 2.

Figure 9:
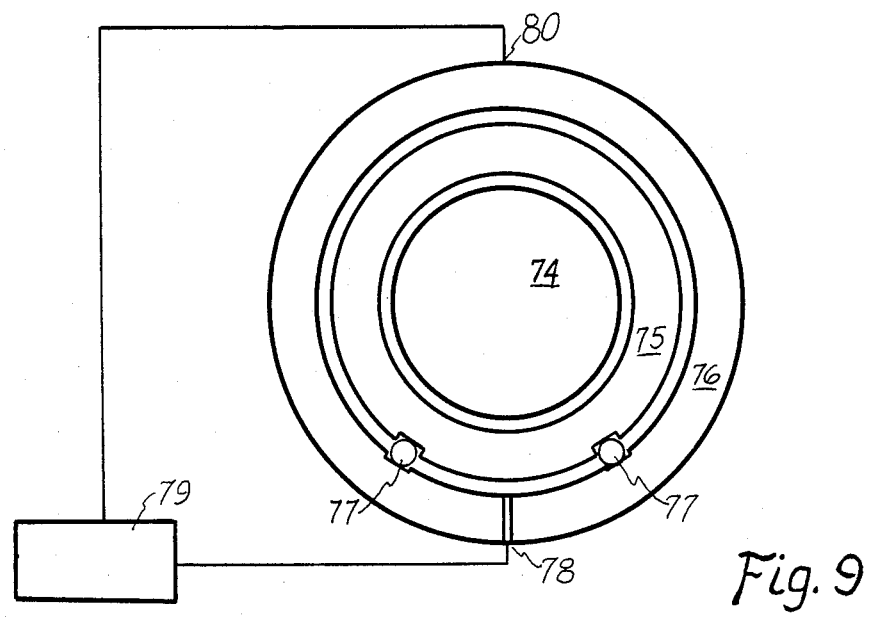
FIG. 9 is yet another embodiment of the concept noted in FIG. 8 by which motion of the bearing support ring is moved directly by variable fluid pressure without using hydraulic actuators.

Another embodiment presented as a variation of FIG. 8 is presented in FIG. 9. In this embodiment the journal 74 is supported in journal ring 75 as in FIG. 8. However, in this embodiment, FIG. 9, journal ring 75 is supported with respect to the machine frame 76 by three or more pressurized cavities formed between the journal ring 75 and frame 76 by seal 77. Selecting a pair of these cavities for illustration, the pressurized cavities are controlled through lines 78 and 80 by controller 79. It will be seen by those skilled in the art that this embodiment offers the ability to control vibrations in the machine in a manner similar to embodiments previously described in this disclosure.

Figure 10:
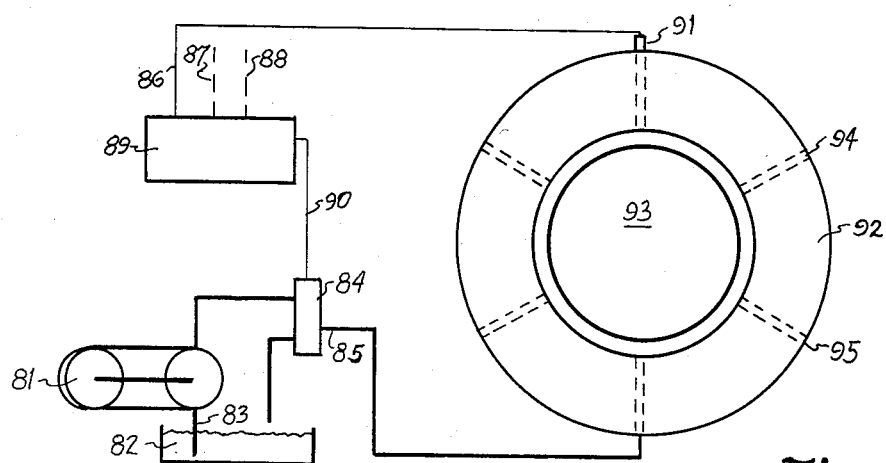
FIG. 10 is an additional embodiment of this invention by which the rotating shaft is caused to move by direct control of the lubricating oil pressure in various regions of the bearing.

Yet another embodiment is illustrated in FIG. 10. Here the journal 93 is supported directly in a journal ring 92 which is rigidly mounted in the machine frame. Thus, this embodiment, FIG. 10, is similar to that of FIG. 9 except that the journal is now supported and controlled by directly pressurized spaces, these spaces being individually pressurized through passageways 94 and 95, as well as 91 and their opposing passageways, each opposing pair of passageways having controlled pressures supplied by a control system made up of components 81 thru 90 as described previously with respect to FIG. 2. It is to be noted that the control means, as described in this patent, have been referenced to fluid film bearings. However, the ideas and algorithms presented here are directly applicable to other types of bearings. For example, the rotor may be supported by magnetic bearings and the same controls will provide the means for optimizing (reducing) the vibration level of the machine. In this case, the controls and optimizing procedure will be directed to either the voltage level or the current level.

Further, this same concept may be applied to so called "anti-friction" bearings by operating on the bearing carrier in the manner previously described. In short, the anti-friction bearings will be treated as just an auxiliary ring attached to the journal with the anti-rotation pin employed on the outer race, for example, to prevent rotation of said race.

Having described our invention we claim:

1. A device for limiting mechanical vibrations of rotary machinery, said device comprising: one or more position detectors for a rotor shaft, said position detectors generating signals each being referenced to the shaft by means of a mark or notch on the shaft or other means; a computer, having a memory, with a control algorithm for manipulating the signals coming from the position detectors, said control algorithm having optimum gain settings; an electronic controller for manipulating hydraulic valves, said hydraulic valves controlling flow of pressurized oil, said oil being supplied by an auxiliary hydraulic pumping system; movable pads of tilt pad fluid film bearings which are radially positioned by said pressurized oil acting through hydraulic actuators, one said actuator acting on one said radially movable pad; said position detectors, hydraulic valves, auxiliary hydraulic pumping system, movable bearing pads, and hydraulic actuators functioning in concert with one another and under feedback control of the computer to continually adjust said pads, and in turn the stiffnesses and damping coefficients of said rotating machinery; during each rotation of the rotor shaft in such an optimum manner as to reduce the peak vibration level of the rotor shaft for each and every speed of rotation, said computer algorithm coacting with previously detected data or stored data, said data stored in the memory of the computer, in an optimum manner to avoid manipulating gross changes in said optimum gain settings of said control algorithm, said gain settings being included in said computer control algorithm and acting on instantaneous shaft motion and which operate on said electronic controller.

2. The invention of claim 1, wherein the device is applied to pressure dam bearings and/or multilobe bearings and/or other forms of fluid film bearings, which in said bearings the pressurized oil is injected into a respective cavity of the particular bearing in an optimum manner thereby effecting proper bearing stiffnesses and damping coefficients of said rotating machinery.

* * * * *